United States Patent [19]

Gellert

[11] Patent Number: 4,787,840
[45] Date of Patent: Nov. 29, 1988

[54] INJECTION MOLDING SINGLE NOZZLE VALVE GATING

[76] Inventor: Jobst U. Gellert, A Prince Street, Georgetown, Ontario, Canada, L7G 2X1

[21] Appl. No.: 145,969

[22] Filed: Jan. 20, 1988

[30] Foreign Application Priority Data

Dec. 17, 1987 [CA] Canada .................................. 554,730

[51] Int. Cl.$^4$ .............................................. B29C 45/20
[52] U.S. Cl. .................. 425/549; 264/328.9; 425/562; 425/564; 425/566; 425/571
[58] Field of Search .................... 264/328.9; 425/562, 425/564, 566, 571, 549

[56] References Cited

U.S. PATENT DOCUMENTS 4,669,971 6/1987 Gellert ................................ 425/562

Primary Examiner—Jay H. Woo
Assistant Examiner—Timothy W. Heitbrink
Attorney, Agent, or Firm—Riches, McKenzie & Herbert

[57] ABSTRACT

The invention relates to a single nozzle injection molding system in which the nozzle is reciprocated longitudinally to valve gate the flow of melt to the cavity. The nozzle has a pointed tip which seats in the gate in the forward closed position and is retracted to the open position. The nozzle is secured against rotation, and an inner collar is secured to it. This inner collar threadably engages a surrounding outer collar which is free to rotate, but secured longitudinally. A pneumatic piston is connected to the outer collar to rotate it through a predetermined angle. Thus, when the outer collar is rotated in one direction, the inner collar and nozzle are driven to the forward closed position, and when the outer collar is rotated in the opposite direction the inner collar and nozzle are retracted to the open position.

7 Claims, 3 Drawing Sheets

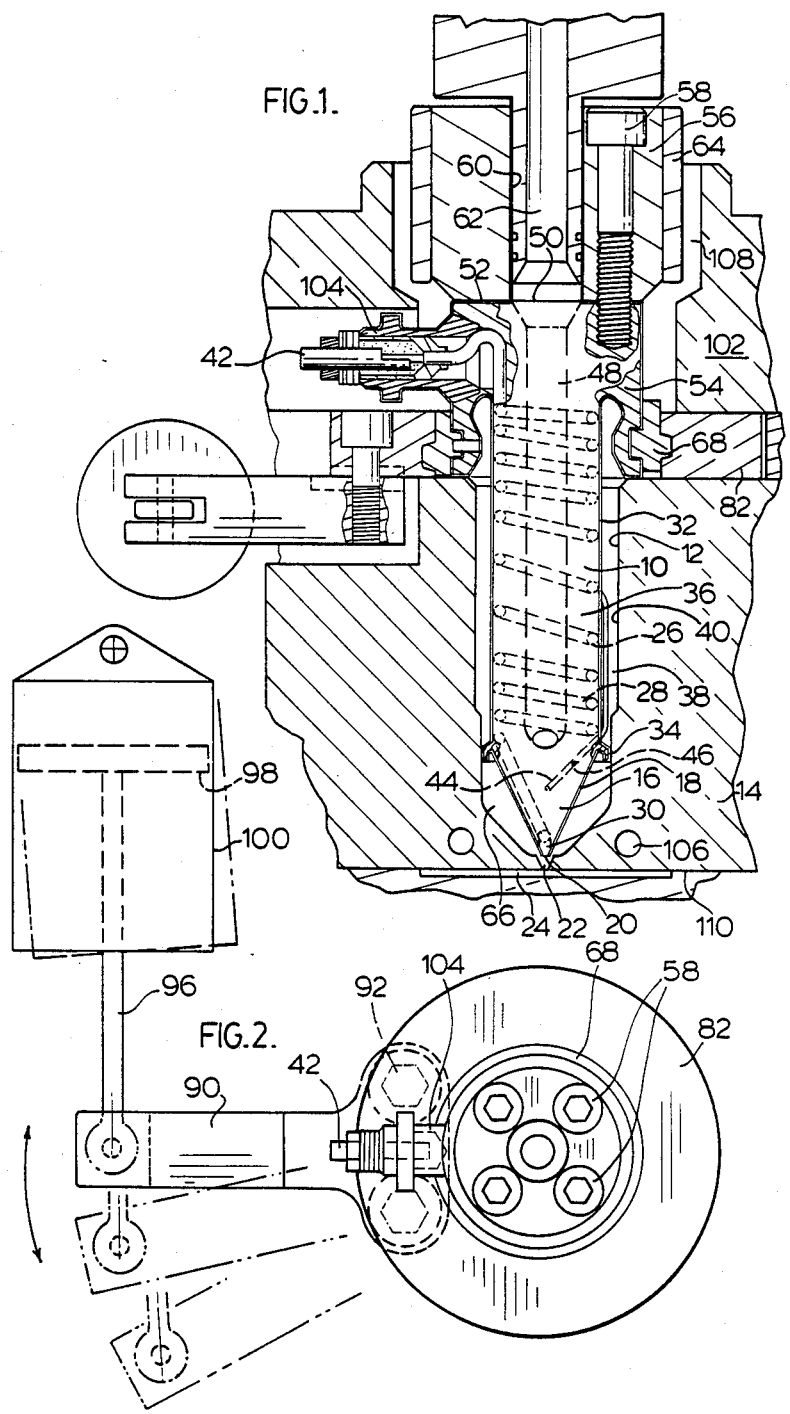

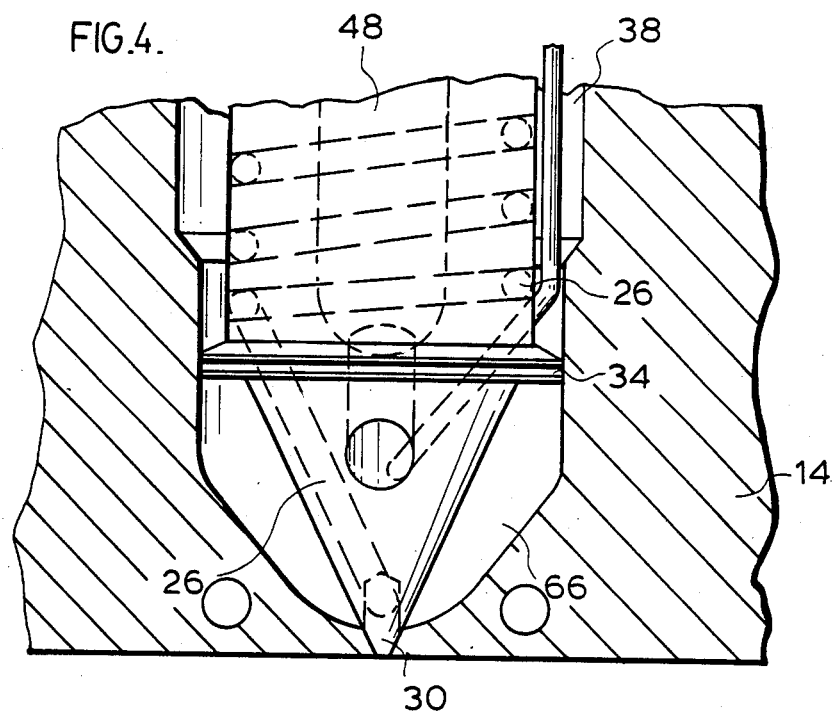
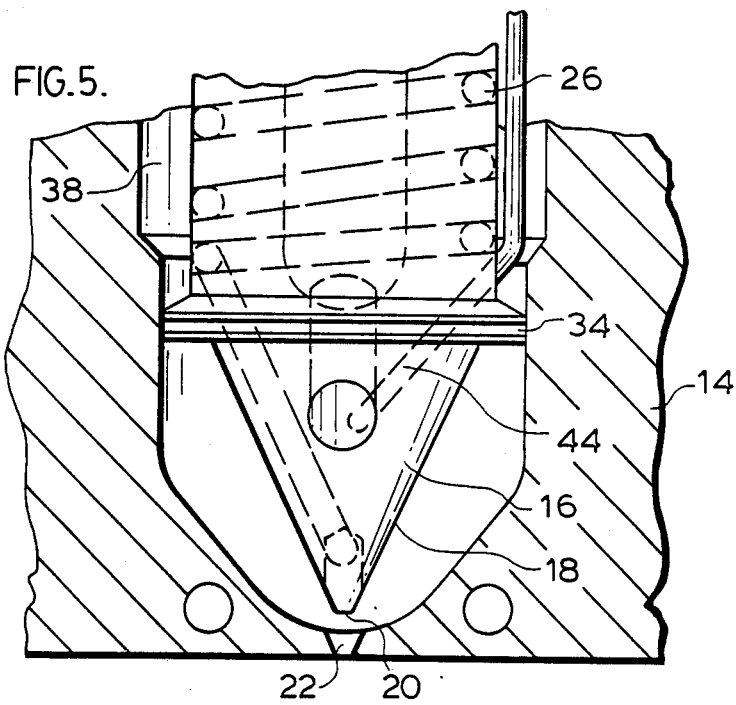

INJECTION MOLDING SINGLE NOZZLE VALVE GATING

BACKGROUND OF THE INVENTION

This invention relates to injection molding and more particularly to an injection molding system in which a heated nozzle having a tip is actuated between a retracted open position and a closed forward position in which the tip is seated in a gate to provide valve gating.

Heated nozzles are well known in the injection molding art, by they are normally seated in a fixed position in a well in the cavity plate. Valve gating is normally provided by a reciprocating valve pin which extends through a central bore in the nozzle. An example of this type of system is shown in the applicants' Canadian patent application Ser. No. 524,969 entitled "Mechanism for Valve Gated Injection Molding with Resilient Retaining Ring" which was filed Dec. 10, 1986. More recently, the applicants' Canadian patent application Ser. No. 542,182 entitled "Injection Molding Multiple Nozzle Valve Gating System" which was filed July 15, 1987 discloses a multi-cavity system in which a number of nozzles are fixed to a common manifold and the manifold and nozzles are actuated together.

Similarly, a system in which a number of injection molding probes are valve gated simultaneously by actuating a common manifold is shown in the applicants' U.S. Pat. No. 4,669,971 entitled "Valve Gate Probe" which issued June 2, 1987. Fixed nozzles having a pointed tip and a sealing and locating flange are well known, as shown, for instance, in the applicants' Canadian patent application Ser. No. 549,519 entitled "Injection Molding Nozzle with Resilient Sealing and Locating Flange" which was filed Oct. 16, 1987. However, none of the prior art shows a system for valve gating a single gate by actuating the nozzle without using the pressurized melt to open the valve.

SUMMARY OF THE INVENTION

Accordingly, it is an object of the invention to at least partially overcome the disadvantages of the prior art by providing a single cavity injection molding system in which valve gating is provided by a simple system of actuating the nozzle between a retracted open position and a forward closed position.

To this end, in one of its aspects, the invention provides a single cavity hot runner injection molding system having a heated nozzle with a hot runner passage which extends to convey pressurized melt from a molding machine to a gate in a temperature controlled cavity plate leading to a cavity, the nozzle being secured against rotational movement and extending into a well in the cavity plate having an inner surface, the nozzle having an outer surface with an air space between the outer surface of the nozzle and the inner surface of the well, the nozzle having a nose portion with a conical surface leading to a tip which is in alignment with the gate, the system including an actuating mechanism to drive the nozzle longitudinally between a retracted open position and a forward closed position wherein the tip of the nose portion of the nozzle is seated in the gate, the improvement wherein the actuating mechanism comprises, an inner collar secured against rotation to the nozzle, an outer collar extending around the inner collar in threadable engagement with the inner collar, the outer collar being secured against longitudinal movement, and, power means connected to the outer collar to rotate the outer collar through a predetermined angle whereby the inner collar is driven longitudinally a distance sufficient to drive the nozzle from the retracted open position to the forward closed position.

Further objects and advantages of the invention will appear from the following description taken together with the accompanying drawings.

BRIEF DESCRIPTION OF THE DRAWINGS

FIG. 1 is a sectional view showing a portion of an injection molding system having mechanism for actuating the nozzle according to a preferred embodiment of the system, FIG. 2 is a plan view of a portion of the system seen in FIG. 1, FIG. 4 is a partial sectional view showing the tip of the nose portion of the nozzle in the forward closed position, and FIG. 5 is a partial sectional view showing the tip of the nose portion of the nozzle in the retracted open position.

DETAILED DESCRIPTION OF THE DRAWINGS

Figure 3:
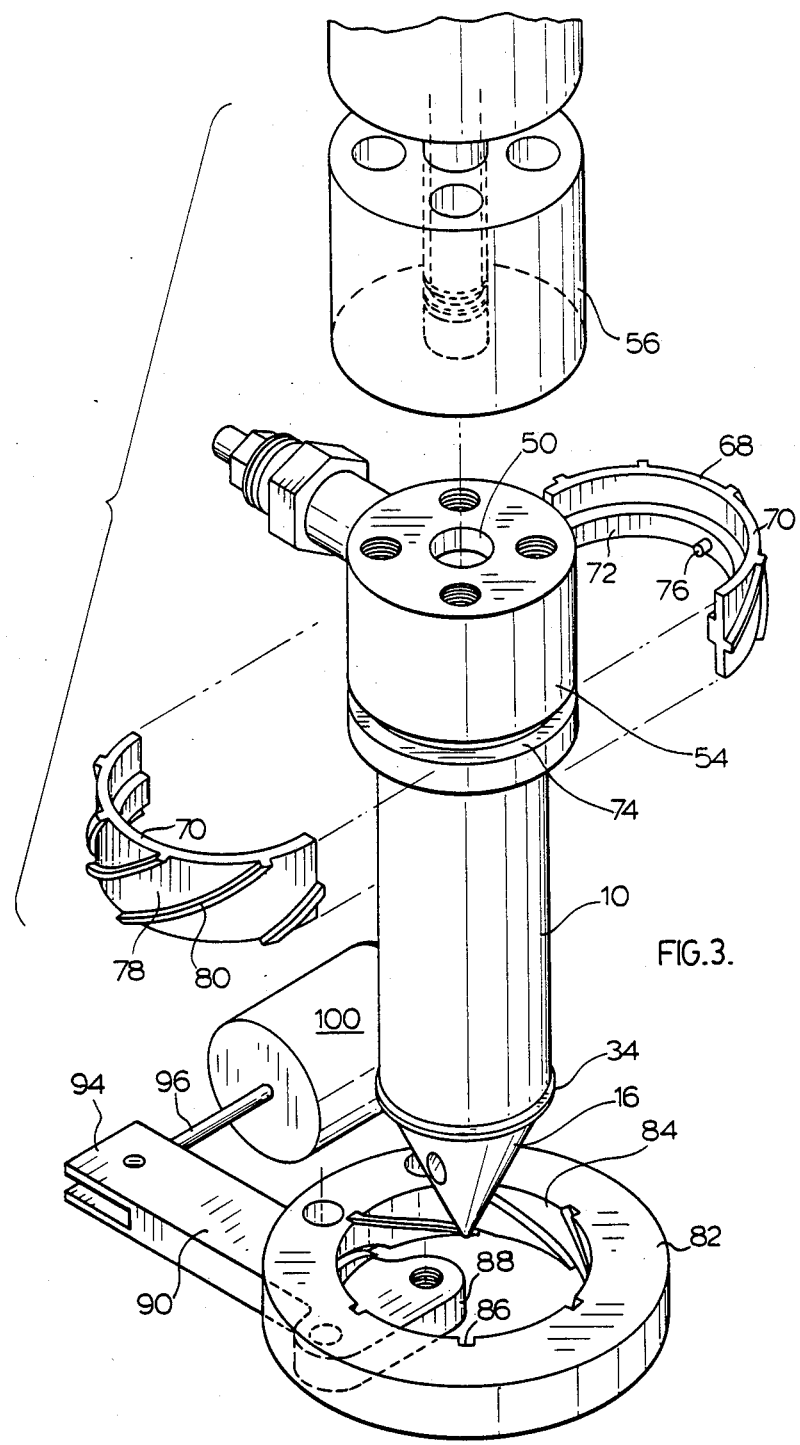
FIG. 3 is an exploded view showing the nozzle and the actuating mechanism seen in FIG. 1.

Reference is first made to FIGS. 1 and 2 which shows a portion of a single cavity injection molding system wherein a nozzle 10 extends into a well 12 in a cavity plate 14. The nozzle 10 has a nose portion 16 with a conical surface 18 leading to a pointed tip 20 at the forward end. The pointed tip 20 is is alignment with a gate 22 which extends through the cavity plate 14 to the cavity 24. The nozzle 10 has an electrical heating element 26 which is brazed in a spiral channel 28 and extends into the nose portion 16 where it is grounded adjacent a high speed steel insert 30 which forms the pointed tip 20, as described in detail in the applicants' Canadian patent application Ser. No. 549,518 entitled "Injection Molding Nozzle Having Grounded Heating Element Brazed into Pointed Tip" filed Oct. 16, 1987. The heating element 26 in the channel 28 and the outer surface 32 are covered with a protective nickel alloy coating as described is the applicants' Canadian patent application Ser. No. 542,185 entitled "Coated Injection Molding Nozzle and Method" filed July 15, 1987.

The nozzle 10 has a sealing and locating flange 34 which extends circumferentially between the cylindrical portion 36 and the nose portion 16 as described in the applicants' Canadian patent application Ser. No. 549,519 entitled "Injection Molding Nozzle with Resilient Sealing and Locating Flange" filed Oct. 16, 1987. The flange extends forwardly and outwardly to bridge the insulative air space 38 between the nozzle 10 and the surrounding cavity plate 14 and abuts against the inner wall 40 of the well 12 to accurately locate the tip 20 in alignment with the gate 22. The electrical heating element 26 extends to an outwardly projecting cold terminal 42 which is formed as described in the applicants' Canadian patent application Ser. No. 549,520 entitled "Method of Manufacture of Injection Molding Nozzle Electrical Terminal" filed Oct. 16, 1987. A lead (not shown) from an external power source is connected to the cold terminal 42 to heat the nozzle to a predetermined temperature. A thermocouple 44 extends into a hole 46 drilled beneath the sealing and locating flange 34 and is connected to a temperature controller which controls the power applied to the heating element 26.

As can be seen, the nozzle 10 has a melt passage 48 which extends centrally from an inlet 50 at the rear end 52 to a diagonal portion which connects to the conical surface 18 of the nose portion 16. The nozzle 10 has a larger diameter collar portion 54 adjacent the rear end 52. A cylindercial nozzle extension 56 is fastened by bolts 58 to the rear end 52 of the nozzle, and the nozzle extension 56 has a central barrel 60 which receives the plunge nozzle 62 of the molding machine. The barrel 60 is in alignment with the inlet 50 to the melt passage 48 to receive pressurized melt from the molding machine. The nozzle extension 56 is heated by an electric heater band 64 to maintain the temperature of the melt flowing through the central barrel 60. The melt flows through the melt passage 48 in the nozzle 10 into a space 66 surrounding the nose portion 16 and through the gate 22 into the cavity 24. The flow of melt through the gate 22 is controlled according to a predetermined cycle by actuating the nozzle 10 longitudinally to provide a valve gate by the tip 20 of the nose portion 16 sealing in the gate in the forward closed position.

The mechanism for actuating the nozzle 10 according to the invention is clearly shown in exploded FIG. 3. An inner collar 68 having two half segments 70 is securely mounted around the collar portion 54 of the nozzle 10. The inner collar 68 has an inwardly projecting rib 72 which is received in a channel 74 in the collar portion 54 of the nozzle 10 to prevent relative longitudinal movement between them. Furthermore, the inner collar 68 has an inwardly projecting pin 76 which is received in a hole (not shown) in the nozzle to prevent relative rotational movement between them. The inner collar 68 has an outer surface 78 with a number of multiple start threads 80 projecting outwardly from it. When assembled, the inner collar 68 is secured in place by an outer collar 82 which extends around it. The outer collar 82 has an inner surface 84 with a number of matching grooves 86 which receive the threads 80 projecting from the inner collar 68. The inner end 88 of a radialy projecting arm 90 is fixed to the outer collar 82 by bolts 92, and the outer end 94 is attached by rod 96 to a pneumatically driven piston 98 in a cylinder 100, when assembled, as shown in FIG. 1, the outer collar 82 is free to be rotated by the piston 98, but is secured against longitudinal movement by being mounted between the cavity plate 14 and the back plate 102. However, the sleeve 104 of the nozzle 10 extends to the cold terminal 42 through an opening in the back plate 102 which prevents the nozzle 10 from rotation. Thus, when the outer collar 82 is rotated through a predetermined angle by the piston 98, the threaded engagement between the inner and outer collars 68,82 causes the inner collar 68 and the nozzle 10 secured to it to move longitudinally a predetermined distance to provide valve gating.

As is well known, it is necessary for there to be thermal separation between the nozzle 10 which is heated by the heating element 26 and the surrounding cavity plate 14 which is cooled by pumping cooling water through cooling conduits 106. Thus, an insulative air space 38 is provided between them, which is bridged by the sealing and locating flange 34, as described above. Similarly, an insulative air space 108 is provided between the heater band 64 extending around the nozzle extension 56 and the surrounding cool back plate 102.

In use, the system is assembled as shown and electrical power is applied to the cold terminal 42 of the heating element 26 and to the heater band 64 to heat the nozzle 10 and the nozzle extension 56 to a predetermined operating temperature with the nozzle 10 in the retracted open position shown in FIG. 5, pressurized melt is injected into the melt passage 48 from the plunge nozzle 62 of the molding machine. The melt flows into the space 66 around the nose portion 16 and through the open gate 22 to fill the cavity 24. The sealing and locating flange 34 extends outwardly and forwardly and is made of resilient steel, whereby the pressurized melt forces it out against the inner surface or wall 40 of the well 12 to prevent leakage of the pressurized melt into the insulative air space 38 around the nozzle 10. A portion of the melt in the space 66 solidifies adjacent the cooled cavity plate 14 which also helps to prevent leakage past the flange 34.

After the cavity is filled injection pressure is held momentarily to pack and then pneumatic pressure is applied to the piston 98 to rotate the outer collar 82 to drive the nozzle 10 to the forward closed position shown in FIG. 4 with the tip 20 seated in the gate 22. After a short cooling period, the injection pressure is released and the mold is opened along the parting line 110 for ejection in a conventional manner. When the mold is closed after ejection, pneumatic pressure to the piston is reversed to withdraw the nozzle 10 to the retracted open position. Melt injection pressure is then reapplied by the molding machine, and this cycle is repeated continuously several times per minute, with the melt pressure and pneumatic pressure to the piston 98 being controlled to operate the system according to this predetermined cycle. While the nozzle is retracted to the open position by applying pnuematic pressure to the piston 98, the force of the melt injection pressure against the conical surface 18 helps to open the gate.

While the description of the system has been given with respect to a particular embodiment, it is not to be construed in a limiting sense. Variations and modifications will occur to those skilled in the art. For instance, the thread 80 can be on the outer collar 82 and the grooves 86 on the inner collar 68 rather than the reverse, as shown. Different means such as a hydraulic cylinder can be used to apply power to rotate the outer collar 82. Reference is made to the appended claims for definition of the invention.

What I claim is:

1. In a single cavity hot runner injection molding system having a heated nozzle with a hot runner passage which extends to convey pressurized melt from a molding machine to a gate in a temperature controlled cavity plate leading to a cavity, the nozzle being secured against rotational movement and extending into a well in the cavity plate having an inner surface, the nozzle having an outer surface with an air space between the outer surface of the nozzle and the inner surface of the well, the nozzle having a nose portion with a conical surface leading to a tip which is in alignment with the gate, the system including an actuating mechanism to drive the nozzle longitudinally between a retracted open position and a forward closed position wherein the tip of the nose portion of the nozzle is seated in the gate, the improvement wherein the actuating mechanism comprises:

(a) an inner collar secured against rotation to the nozzle, (b) an outer collar extending around the inner collar in threadable engagement with the inner collar, the outer collar being secured against longitudinal movement, and, (c) power means connected to the outer collar to rotate the outer collar through a predetermined angle whereby the inner collar is driven longitudinally a distance sufficient to drive the nozzle from the retracted open position to the forward closed position.

2. An injection molding system as claimed in claim 1 wherein the power means is controlled to continuously reciprocate the nozzle between the retracted open position and the forward closed position according to a predetermined cycle.

3. An injection molding system as claimed in claim 2 wherein the power means comprises a pneumatically actuated piston connected to an arm extending from the outer collar.

4. An injection molding system as claimed in claim 3 wherein the inner collar comprises a number of segments which are interlockably mounted around the outer surface of the nozzle to prevent relative movement between the nozzle and the inner collar.

5. An injection molding system as claimed in claim 4 wherein the nozzle has a circumferential sealing and locating flange which extends outwardly from the outer surface of the nozzle adjacent the nose portion to bridge the air space between the outer surface of the nozzle and the inner surface of the well.

6. An injection molding system as claimed in claim 5 wherein the inner collar has an outer surface and the outer collar has an inner surface surrounding the outer surface of the inner collar, the inner collar having a plurality of multiple start threads which project outwardly from the outer surface of the inner collar and are received in a corresponding number of matching grooves in the inner surface of the outer collar.

7. An injection molding system as claimed in claim 3 wherein the inner collar has an outer surface and the outer collar has an inner surface surrounding the outer surface of the inner collar, the outer collar having a plurality of multiple start threads which project inwardly from the inner surface of the outer collar and are received in a corresponding number of matching grooves in the outer surface of the inner collar.

* * * * *